US 8,200,427 B2

(12) United States Patent
Cho et al.

(10) Patent No.: US 8,200,427 B2
(45) Date of Patent: Jun. 12, 2012

(54) METHOD FOR PROVIDING POI INFORMATION FOR MOBILE TERMINAL AND APPARATUS THEREOF

(75) Inventors: Chae-Guk Cho, Gyeonggi-Do (KR); Ki-Hyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 12/483,029

(22) Filed: Jun. 11, 2009

(65) Prior Publication Data

US 2010/0125407 A1 May 20, 2010

(30) Foreign Application Priority Data

Nov. 17, 2008 (KR) .................. 10-2008-0114240

(51) Int. Cl.
*G01C 21/00* (2006.01)
*G01C 21/34* (2006.01)
*G01C 21/36* (2006.01)
(52) U.S. Cl. ........ 701/426; 701/438; 701/468; 701/526; 340/995.24
(58) Field of Classification Search .................. None
See application file for complete search history.

(56) References Cited

U.S. PATENT DOCUMENTS

| 6,278,940 | B1 * | 8/2001 | Endo .................. 701/209 |
| 6,571,169 | B2 * | 5/2003 | Miyaki ............... 701/200 |
| 7,460,953 | B2 * | 12/2008 | Herbst et al. ........... 701/211 |
| 2008/0147730 | A1 * | 6/2008 | Lee et al. ............ 707/104.1 |
| 2008/0268876 | A1 * | 10/2008 | Gelfand et al. ........ 455/457 |
| 2009/0049004 | A1 * | 2/2009 | Nurminen et al. ........ 707/1 |
| 2009/0232417 | A1 * | 9/2009 | McMahan ............... 382/309 |
| 2009/0319178 | A1 * | 12/2009 | Khosravy et al. ........ 701/207 |

FOREIGN PATENT DOCUMENTS

| JP | 2004-226190 | * | 8/2004 |
| WO | WO 2005/079309 | * | 9/2005 |

* cited by examiner

*Primary Examiner* — Michael J. Zanelli
(74) *Attorney, Agent, or Firm* — Birch, Stewart, Kolasch & Birch, LLP

(57) ABSTRACT

A method and apparatus for providing point of interest (POI) information of a mobile terminal are disclosed to extract and provide POI information and/or road information included in an image captured by a camera. Location information of an image capture place and image capture direction information are read from the digital photo image, the POI information corresponding to the location and image capture direction information is extracted from map data, and the extracted POI information is displayed on the digital photo image.

17 Claims, 10 Drawing Sheets

METHOD FOR PROVIDING POI INFORMATION FOR MOBILE TERMINAL AND APPARATUS THEREOF

CROSS REFERENCE TO RELATED APPLICATIONS

This nonprovisional application claims priority under 35 U.S.C. §119(a) from Patent Application No. 10-2008-0114240, filed in the Republic of Korea on Nov. 17, 2008, the entire contents of which are hereby incorporated by reference.

BACKGROUND OF THE INVENTION

1. Field of the Invention

The present invention relates to a method and apparatus for providing POI (Point of Interest or Point of Information) information of a mobile terminal.

2. Description of the Background Art

In general, a vehicle navigation device applied to a mobile terminal, in particular, to a telematics terminal, is a device for generating road guidance information based on a global positioning system (GPS) signal and map information, and providing the road guidance information to a user. In addition, the vehicle navigation device provides POI information to the user.

FIG. 1 illustrates the background art vehicle navigation system.

As shown in FIG. 1, the background art vehicle navigation system includes an information providing center 3 providing traffic information, and a telematics terminal 4 which may be mounted within a vehicle or carried by a user, receives traffic information via a wireless communication network 2, and provides a road guidance service, based on a GPS signal received via an artificial satellite 1, and the traffic information.

SUMMARY OF THE INVENTION

According to an aspect of the invention, there is provided a method for providing POI information of a mobile terminal, including: reading location information of an image capture place from a digital photo image and information about an image capture direction; extracting POI (Point Of Interest) information corresponding to the location and image capture direction information from map data; and displaying the extracted POI information on the digital photo image.

The POI information corresponding to the location information of the image capture place, the image capture direction information, altitude information of the image capture place, and image capture angle information from the digital photo image may be extracted from the map data.

The POI information extracted from the map data may be matched to the digital photo image.

The POI information extracted from the map data may be recorded on the digital photo image.

One or more of the name, the address, and a phone number of a building corresponding to the POI information extracted from the map data may be displayed on the digital photo image.

When the POI information displayed on the digital photo image is selected, the selected POI information may be set as a destination.

According to another aspect of the invention, there is provided an apparatus for providing POI information of a mobile terminal, including: a storage unit configured to store map data; and a controller configured to read location information of an image capture place and image capture direction information from a digital photo image, extract POI information corresponding to the location and image capture direction information from the map data, and display the extracted POI information on the digital photo image.

The POI information corresponding to the location information of the image capture place, the image capture direction information, altitude information of the image capture place, and image capture angle information from the digital photo image may be extracted from the map data.

The POI information extracted from the map data may be matched to the digital photo image.

The POI information extracted from the map data may be recorded on the digital photo image.

One or more of the name, the address, and a phone number of a building corresponding to the POI information extracted from the map data may be displayed on the digital photo image.

When the POI information displayed on the digital photo image is selected, the selected POI information may be set as a destination.

The foregoing and other objects, features, aspects and advantages of the present invention will become more apparent from the following detailed description of the present invention when taken in conjunction with the accompanying drawings.

DETAILED DESCRIPTION OF THE INVENTION

A method and apparatus for providing point of interest (POI) information of a mobile terminal capable of recording and displaying POI information on a photo image captured by a camera based on location information and image capture direction information included in the photo image, and providing road guidance information based on the recorded and displayed POI information according to exemplary embodiments of the present invention will now be described with reference to FIGS. 2 to 13.

Figure 1:
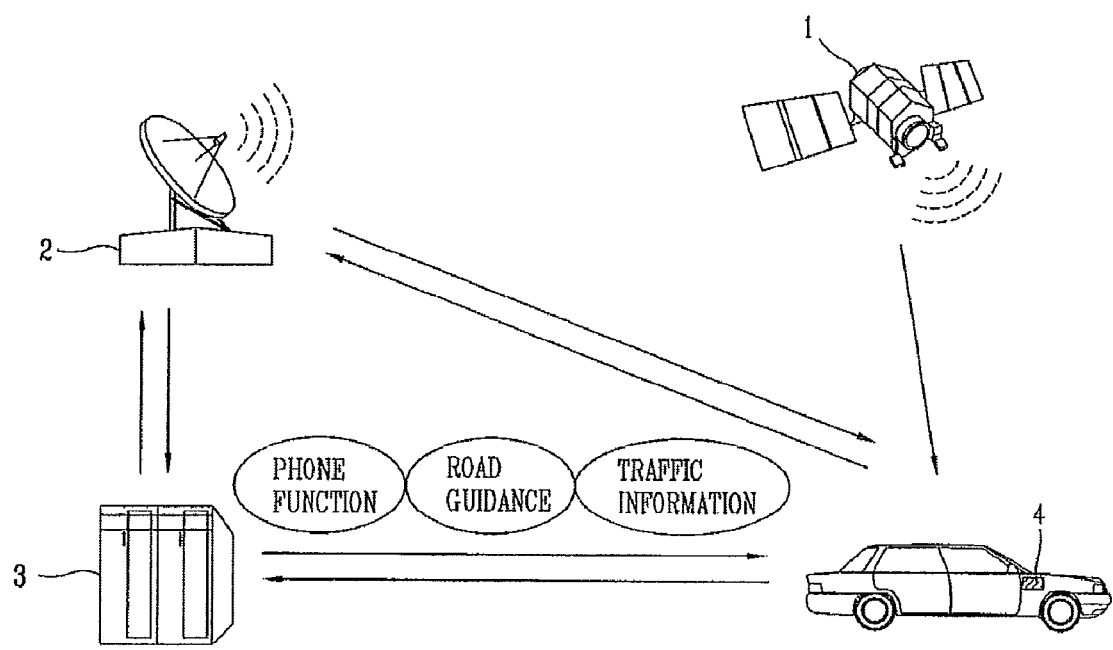
FIG. 1 illustrates the related art vehicle navigation system.
Figure 2:
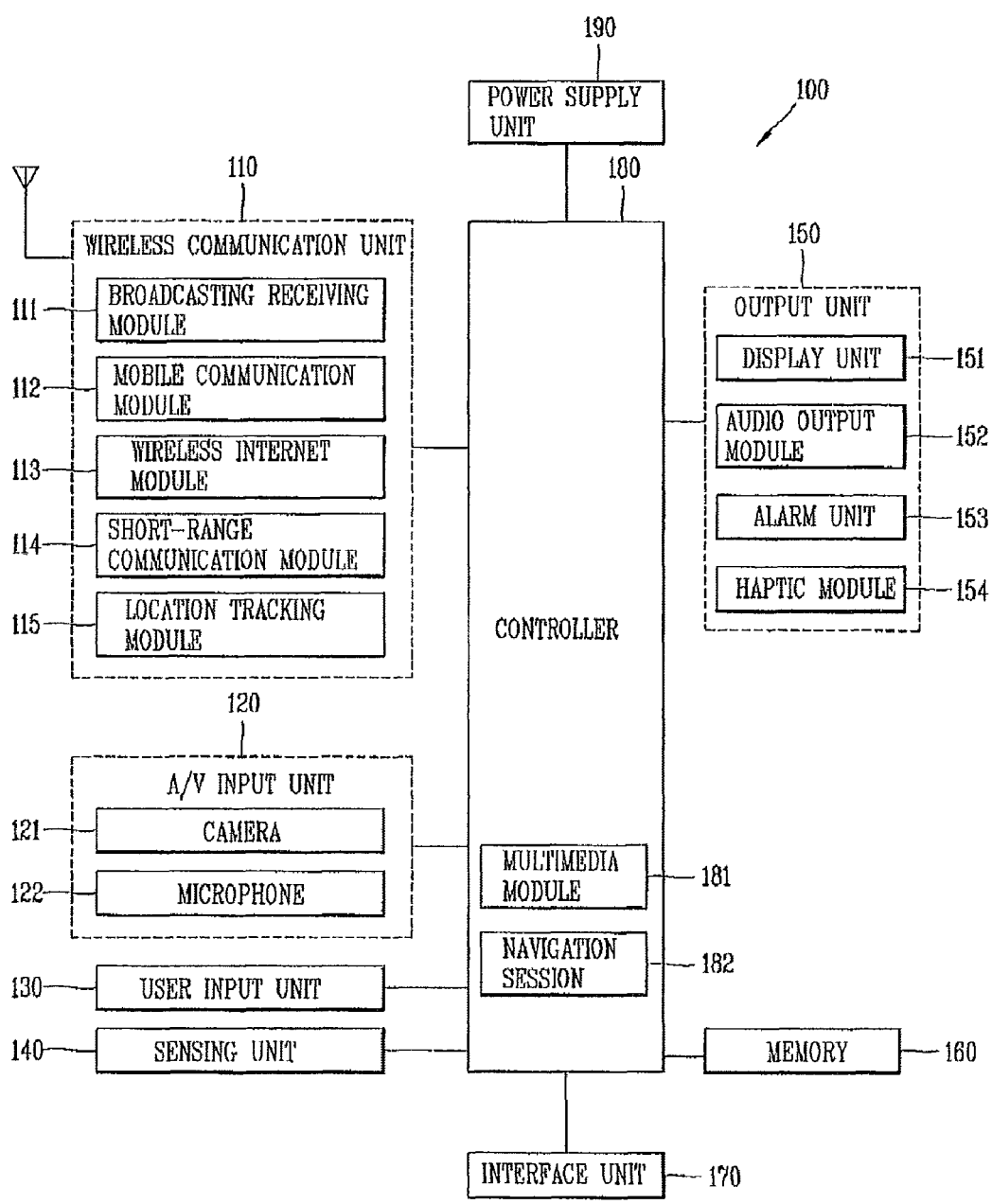
FIG. 2 is a schematic block diagram showing a configuration of a mobile communication terminal employing a point of interest (POI) information providing apparatus according to an embodiment of the present invention.

FIG. 2 is a schematic block diagram showing the configuration of a mobile communication terminal employing a point of interest (POI) information providing apparatus according to an embodiment of the present invention. The mobile communication terminal (mobile phone) 100 may be implemented in various forms. For example, the mobile terminal described in the present invention may include mobile phones, smart phones, notebook computers, digital broadcast terminals, PDAs (Personal Digital Assistants), PMPs (Portable Multimedia Player), navigation devices (vehicle navigation devices), GPS cameras, and the like. The GPS camera is a device for recording location information on photo image data captured based on a GPS signal. Methods for recording location data on photo image data are disclosed in Japanese Patent No. 2003-283977, Japanese Patent No. 2004-252081, Japanese Patent No. 2007-114942, Japanese Patent No. 2008-118695, the entire contents of which being hereby incorporated by reference.

As shown in FIG. 2, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 2 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location tracking module 115 is a module for checking or acquiring a location (or position) of the mobile terminal. For example, the location tracking module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location tracking module 115, a Wi-Fi position system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. For example, the haptic module 154 may be provided at a steering wheel, a gear shift lever, a seat of a car, and the like.

The memory 160 may store programs used for the processing and controlling operations performed by the controller 180, or may temporarily store data (e.g., a phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. Also, the mobile terminal 100 may be operated in relation to a web storage device that performs the storage function of the memory 160 over the Internet.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

A navigation session 182 applied to the mobile communication terminal 100 generates road guidance information and provides the generated road guidance information to the user.

A POI information providing apparatus of the mobile communication terminal 100 according to an embodiment of the present invention includes: the memory 160 for storing map data; and the controller 180 for reading location information and image capture direction information included in a digital photo image captured by the camera 121, reading map data corresponding to the location information and image capture direction information from the memory 160, extracting POI information and/or road information included in the digital photo image from the read map data, and recording the extracted POI information and/or road information on the digital photo image. Here, the image capture direction information may be detected by a digital compass, which is a known art, so its description will be omitted.

The navigation session 182 displays the digital photo image having a plurality of POI information on the display unit 151. When particular POI information is selected from among the plurality of POI information by the user, the navigation session 182 may set the selected POI information as a destination and guide a travel route from a current location to the set destination.

Hereinafter, the configuration of a telematics terminal 200 employing the POI information providing apparatus according to an embodiment of the present invention will now be described with reference to FIG. 3.

Figure 3:
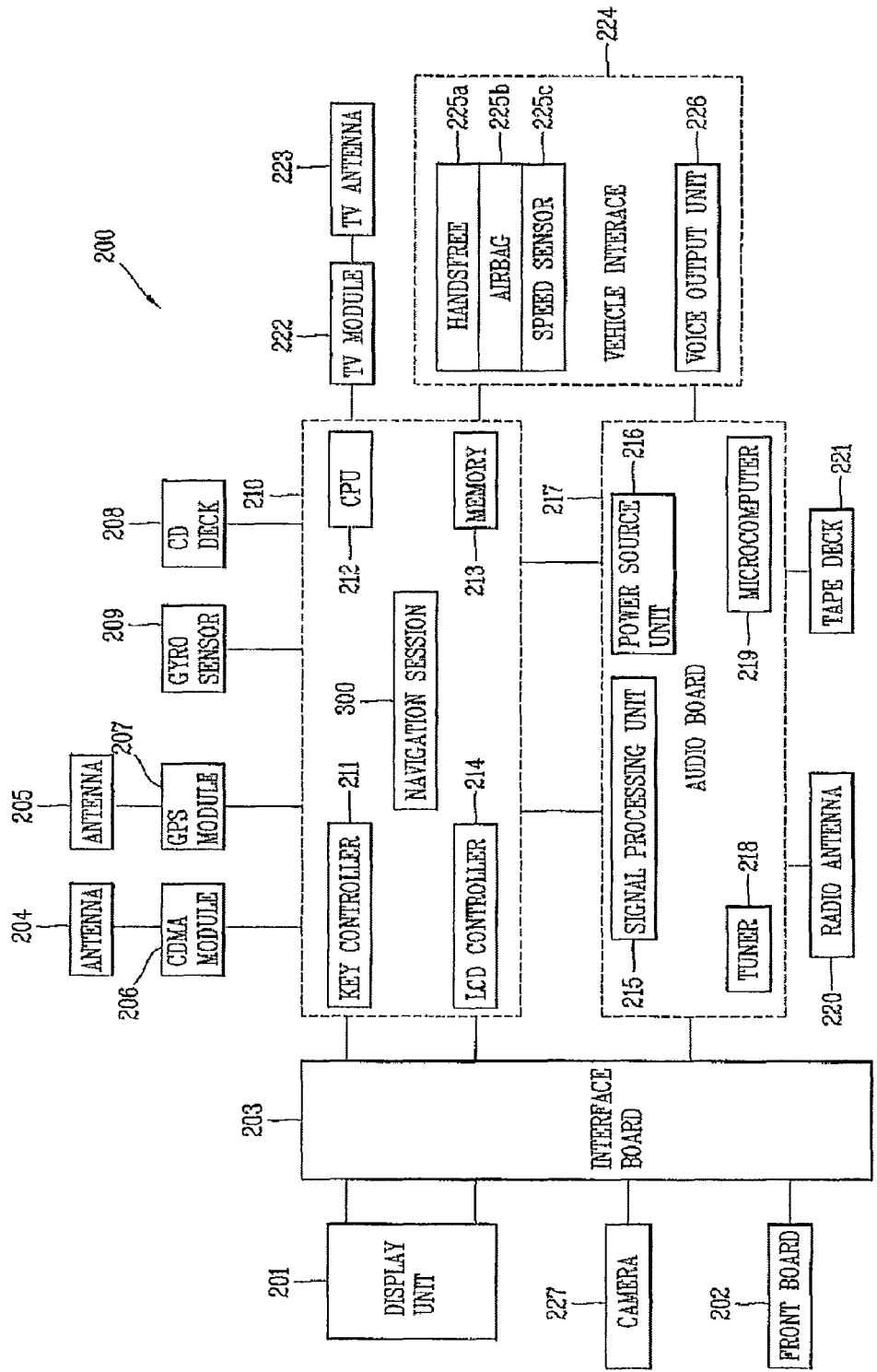
FIG. 3 is a schematic block diagram showing a configuration of a telematics terminal employing a point of interest (POI) information providing apparatus according to an embodiment of the present invention.

FIG. 3 is a schematic block diagram showing the configuration of the telematics terminal 200 employing the POI information providing apparatus according to an embodiment of the present invention.

As shown in FIG. 3, the telematics terminal 200 includes a main board 210 including a central processing unit (CPU) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The telematics terminal 200 includes a CDMA module 206, a mobile terminal having a unique device number as assigned and installed in the vehicle, a GPS module 207 for receiving a GPS signal for guiding the location of the vehicle or tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A TV module 222 may also be connected with the main board 210 to receive a TV signal via a TV antenna 223. An LCD 201 under the control of the LCD controller 214, a front board 202 under the control of the key controller 211, and a camera 227 for capturing images of the interior and/or exterior of the vehicle may be connected to the main board 210 via an interface board 203. The LCD 201 displays various video signals and character signals, and the front board 202 includes buttons for various key signal inputs and provides a key signal corresponding to a button selected by the user to the main board 210. The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 is connected to a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (i.e., amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

A navigation session 300 applied to the telematics terminal 200 generates road guidance information based on the map data and current location information of the vehicle and provides the road guidance information to a user.

The POI information providing apparatus of the telematics terminal 200 according to an embodiment of the present invention includes: a memory 213 for storing map data; and a CPU 212 for reading location information and image capturing direction information included in a digital photo image captured by the camera 227, reading map data corresponding to the location information and the image capture direction information from the memory 213, extracting POI information and/or road information included in the digital photo image from the read map data, and recording the extracted POI information and/or road information on the digital photo image. Here, the image capture direction information may be detected through a digital compass or vehicle travel direction information. This is a known art, so its detailed description will be omitted. The POI information providing apparatus of the telematics terminal 200 can provide more accurate POI information and/or road information included in the digital photo image by adding altitude data of the place where the digital photo image is captured and image capture angle data to the digital photo image.

In addition, the navigation session 300 may display the digital photo image having a plurality of pieces of POI information on the display unit 201, and when particular POI information is selected from the plurality of pieces of POI information by the user, the navigation session 300 may set the selected POI information as a destination and guide a travel path from the current location to the set destination.

Here, the function of the navigation session 300 according to the embodiment of the present invention may be performed by the CPU 212 of the telematics terminal 200.

Hereinafter, the POI information providing apparatus according to an embodiment of the present invention will now be described in detail by applying the navigation device of the telematics terminal 200. The navigation device may be applied to the telematics terminal 200 or may be independently configured rather than being applied to the mobile communication terminal 100.

Figure 4:
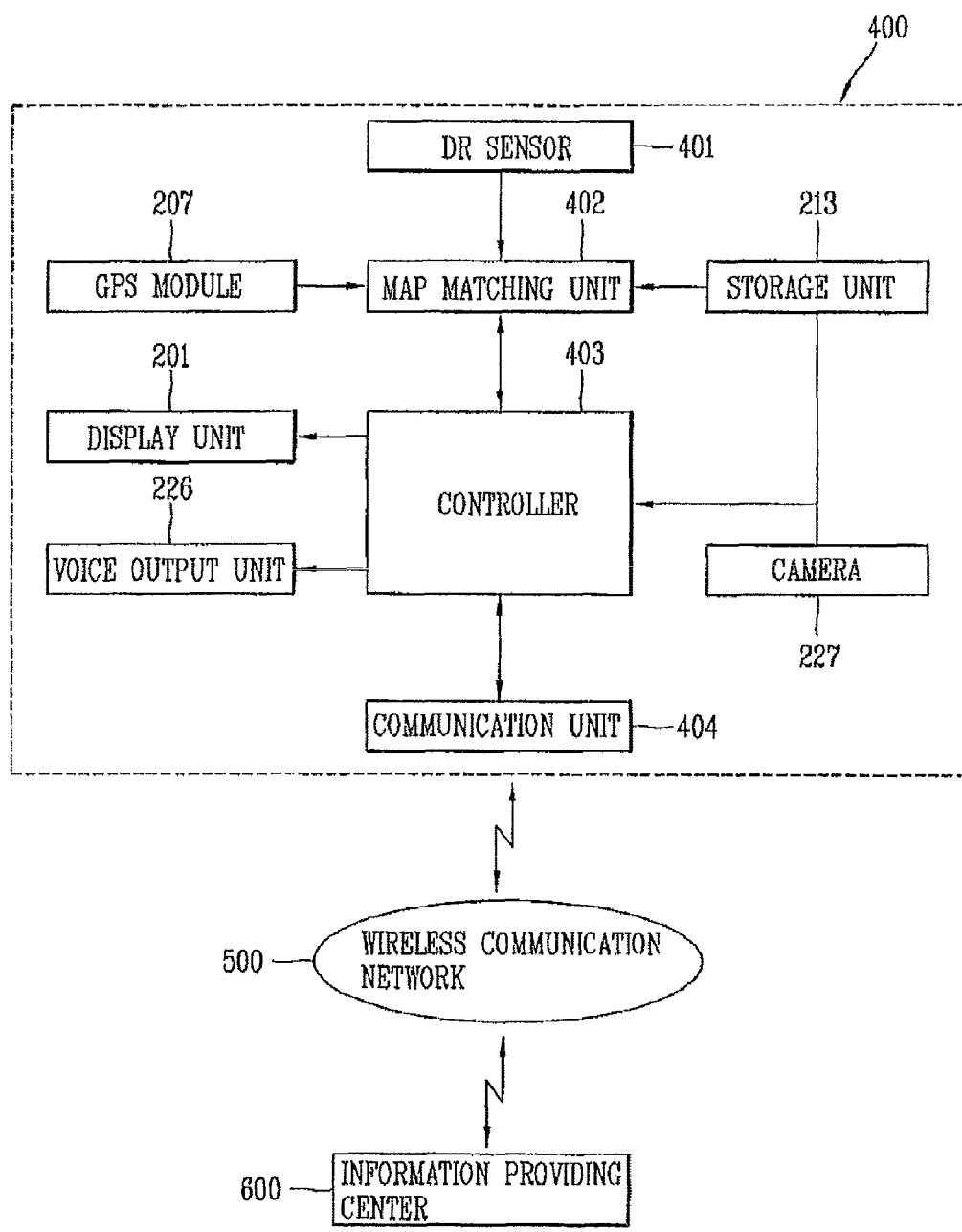
FIG. 4 is a schematic block diagram showing a configuration of a navigation device employing the POI information providing apparatus according to an embodiment of the present invention.

FIG. 4 is a schematic block diagram showing the configuration of the navigation device employing the POI information providing apparatus according to an embodiment of the present invention. Here, for elements in FIG. 4 having the same function as those in FIG. 3, the same reference numerals will be used.

As shown in FIG. 4, a navigation device 400 employing the POI information providing apparatus according to an embodiment of the present invention includes a GPS module 207 that receives a GPS signal from a satellite and generates first vehicle location data of the navigation device (at the same position as the telematics terminal 200 or the mobile communication terminal 100) based on the received GPS signal; a dead-reckoning (DR) sensor 401 that generates second vehicle location data based on a travel direction of a vehicle and the speed of the vehicle; a memory (or a storage unit) 213 that stores map data; a map matching unit 402 that generates a vehicle estimation location based on the first and second vehicle location data, matches the generated vehicle estimation location and a link in map data (i.e., map matching link or map matching road) stored in the storage unit 213, and outputs the matched map information (map matching result); a communication unit 404 that receives real time traffic information from the information providing center 600 via a wireless communication network 500; a controller 403 that generates road guidance information based on the matched map information (map matching result), extracts the POT information and/or road information included in the digital photo image from the map data based on the location information and image capture direction information included in the digital photo image captured by the camera 227, and records and displays the extracted POI information and/or road information on the digital photo image; a display unit 201 that displays a road guidance map included in the road guidance information; and a voice output unit 226 that outputs road guidance voice information (road guidance voice message) included in the road guidance information.

The POI information providing apparatus according to an embodiment of the present invention can additionally record altitude data of the place where the digital photo image is captured and image capture angle data to provide more accurate POI information and/or road information included in the digital photo image. For example, the POI information providing apparatus according to an embodiment of the present invention may further include: an altitude detecting unit (not shown) that detects the altitude of the image capture place; and an angle detecting unit (not shown) that detects the image capture angle. The POI information providing apparatus applied to the telematics terminal 200 may record current vehicle location information, vehicle proceeding direction information, vehicle rotation angle information, and altitude information of a place where the vehicle is located on the digital photo image captured by the camera 227 of the telematics terminal 200, and this may be designed according to various methods by the person in the art.

The controller 403 may display the digital photo image having a plurality of pieces of POI information on the display unit 201, and when particular POI information is selected by the user from among the plurality of pieces of POI information, the controller 403 may set the selected POI information as a destination and guide a travel path from a current location to the set destination.

Hereinafter, the operation of the POI information providing apparatus according to a first embodiment of the present invention will now be described with reference to FIGS. 4 to 8.

Figure 5:
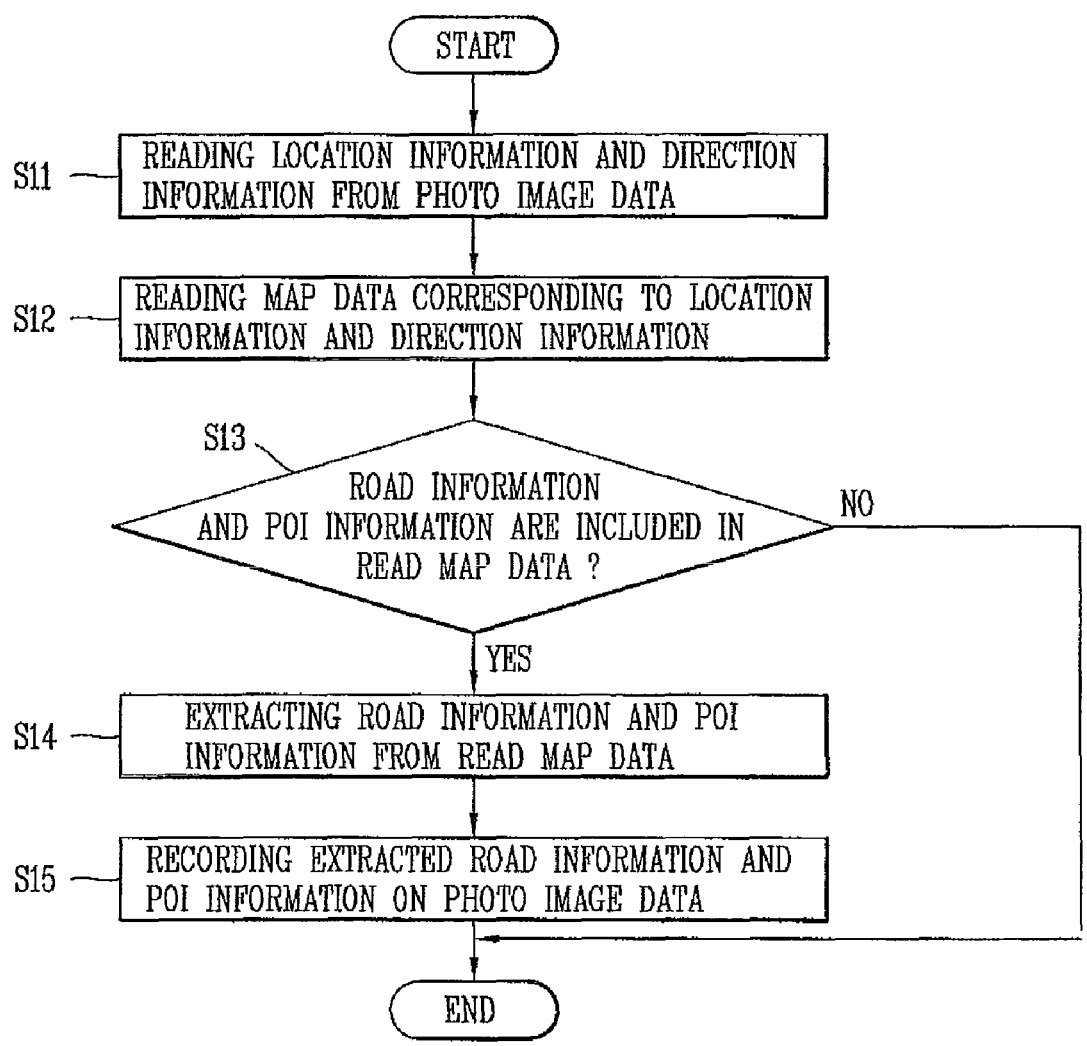
FIG. 5 is a flow chart illustrating a method for providing POI information according to a first embodiment of the present invention.

FIG. 5 is a flow chart illustrating the process of a method for providing POI information according to a first embodiment of the present invention.

First, the controller 403 receives a digital photo image captured by the camera 227 via an external device (e.g., a USB memory unit) or the communication unit 404. Here, the digital photo image received by the controller 402 may include location information or image capture direction information, or include image capture angle information and altitude information.

The controller 403 reads the location information and image capture direction information from the received digital photo image (photo image data) (S11). For example, the controller 403 reads the received location information of the place where the digital photo image has been captured and the information about the direction in which the digital photo image has been captured.

Referring to the related art, a digital photo image may include various roads and buildings (POI information), but information regarding roads included in the digital photo image and information regarding buildings cannot be detected. However, in the present invention, the road information and POI information corresponding to the location information of the image capture place and the image capture direction information included in the captured digital photo image can be extracted from the map data, so the information regarding roads and the information regarding buildings included in the digital photo image can be detected.

Figure 6:
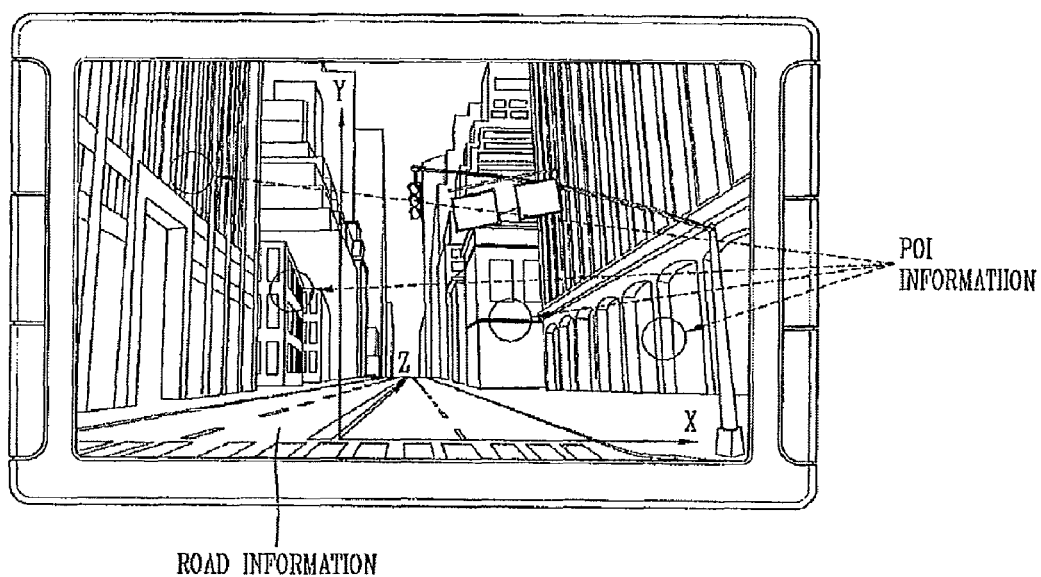
FIG. 6 illustrates a digital photo image captured by the POI information providing apparatus according to the first embodiment of the present invention.

FIG. 6 illustrates a digital photo image captured by the POI information providing apparatus according to the first embodiment of the present invention.

As shown in FIG. 6, the controller 403 reads the location information, the image capture direction information, the image capture angle information and the altitude information from the received digital photo image in order to extract the road information and the plurality of pieces of POI information included in the received digital photo image.

Turning back to FIG. 5, the controller 403 reads the map data corresponding to the location information and image capture direction information, which have been read from the digital photo image, from the storage unit 213 (S12). Here, the controller 403 may read the map data corresponding to the location information, the image capture direction information, the image capture angle information and the altitude information, which have been extracted from the digital photo image, from the storage unit 213.

In order to match the digital photo image with the read map data, the controller 403 determines whether or not there is POI information and/or road information in the read map data (S13). Here, the POI information included in the read map data refers to major geographical figures and natural features (e.g., a building name, a representative phone number of a building, the address of a building) corresponding to the location information and image capture direction information of the digital photo image.

The controller 403 extracts the POI information and/or road information from the read map data (S14). Here, when matching the digital photo image to the read map data, the controller 403 matches POI information and/or road information, excluding map within the read map data, to the digital photo image. Accordingly, the POI information and/or road information are displayed on the digital photo image.

Figure 7:
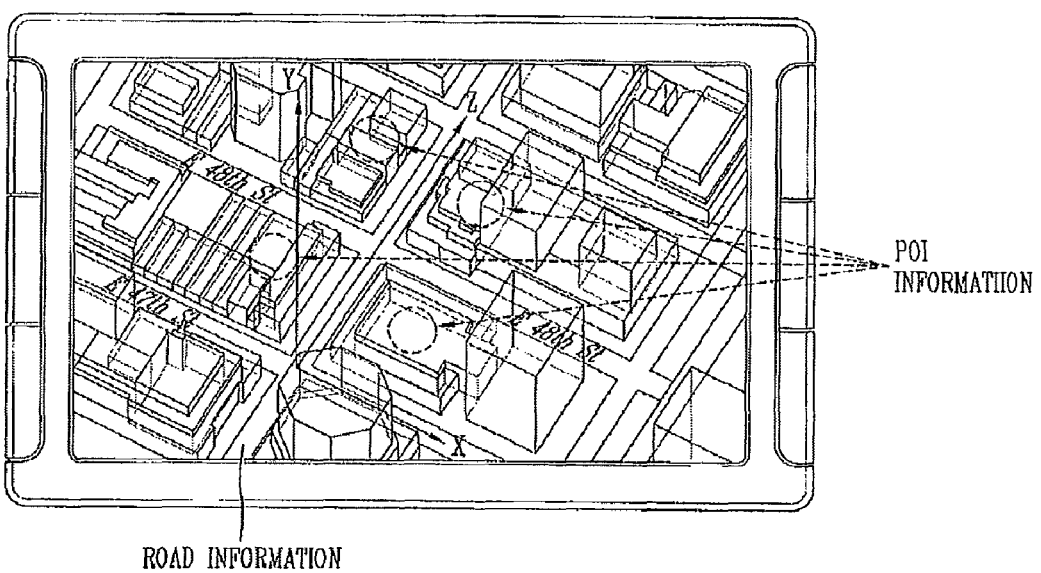
FIG. 7 illustrates map data read by the POI information providing apparatus according to the first embodiment of the present invention.

FIG. 7 illustrates map data read by the POI information providing apparatus according to the first embodiment of the present invention.

As shown in FIG. 7, in order to match the digital photo image to the read map data, the controller 403 extracts the POI information and/or road information from the map data corresponding to the location information, the image capture direction information, the image capture angle information, and the altitude information of the digital photo image.

Turning back to FIG. 5, the controller 403 records the extracted POI information and/or road information on the digital photo image (S15). Here, the controller 403 may transmit the digital photo image including the POI information and/or road information to a user who wants the POI information via the communication unit 404. Thus, multiple users may use the POI information (including the road information) actually included in the digital photo image.

Figure 8:
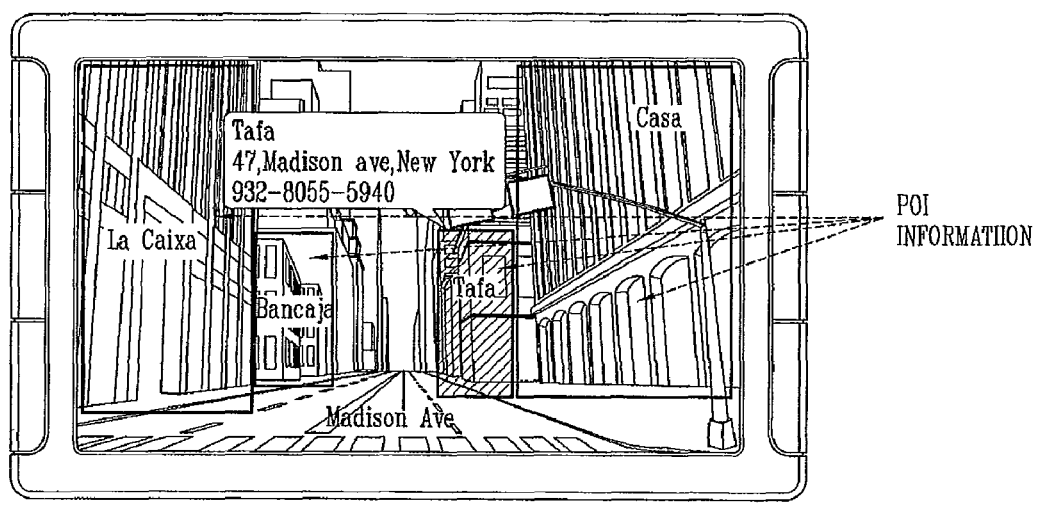
FIG. 8 illustrates POI information (including road information) matched to the digital photo image by the POI information providing apparatus according to the first embodiment of the present invention.

FIG. 8 illustrates POI information (including road information) matched to the digital photo image by the POI information providing apparatus according to the first embodiment of the present invention.

As shown in FIG. 8, the controller 403 extracts the POI information and/or road information from the map data corresponding to the location information, the image capture direction information, the image capture angle information, and the altitude information of the digital photo image, and matches the extracted POI information and/or road information to the digital photo image. Here, when a particular building is selected from a plurality of buildings displayed on the digital photo image, the controller displays POI information (e.g., a building name, the address of the building, a phone number of the building) corresponding to the selected building.

Hereinafter, the operation of the POI information providing apparatus according to a second embodiment of the present invention will now be described with reference to FIGS. 4 and 9 to 13.

Figure 9:
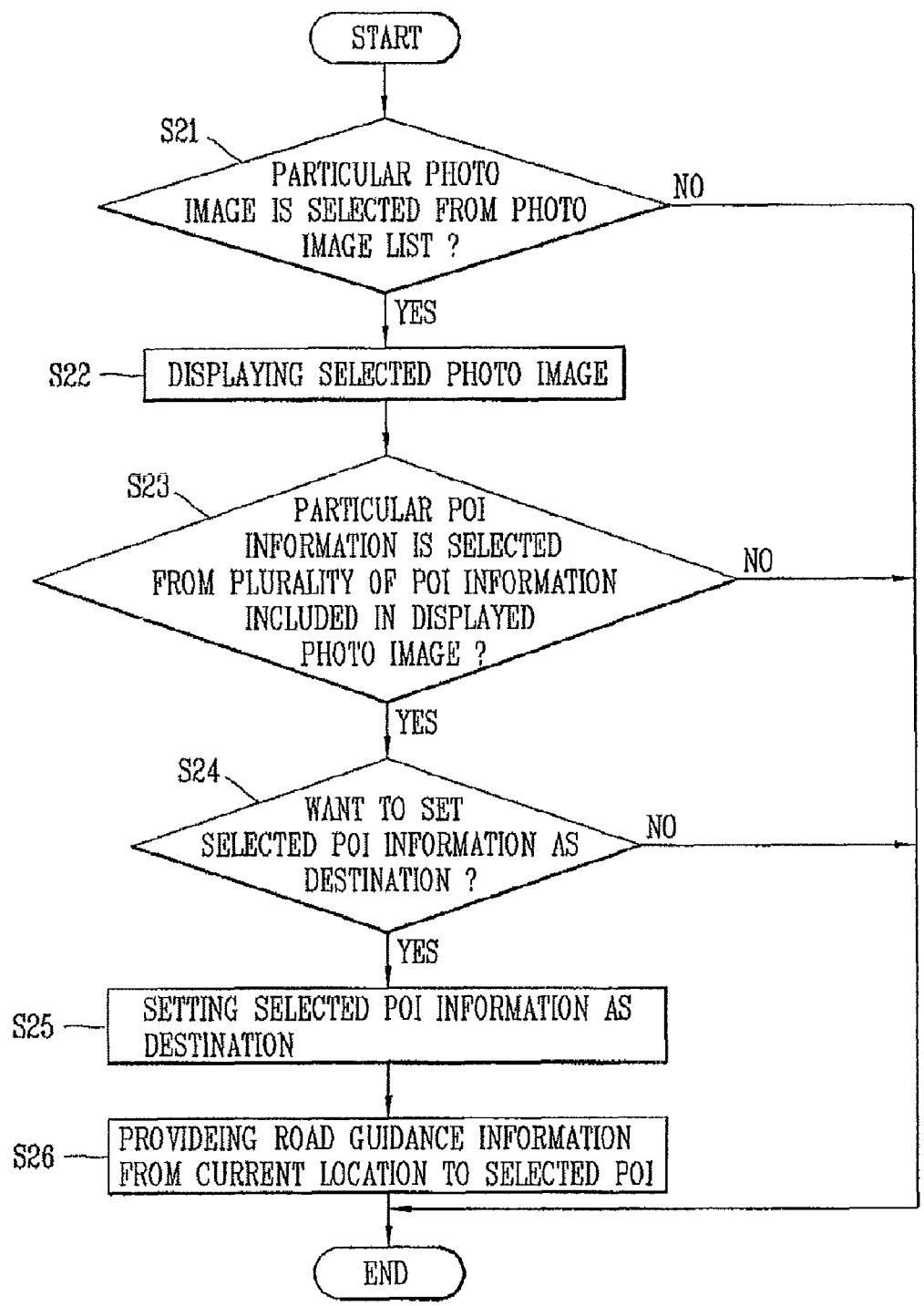
FIG. 9 is a flow chart illustrating a method for providing POI information according to a second embodiment of the present invention.

FIG. 9 is a flow chart illustrating the process of a method for providing POI information according to a second embodiment of the present invention.

First, the controller 403 determines whether or not a POI photo image list (i.e., POI picture list) displayed on the display unit 201 is selected. The POI photo image list is linked to a plurality of digital photo images having the POI information and the road information and includes a location list indicating locations of the digital photo images.

Figure 10:
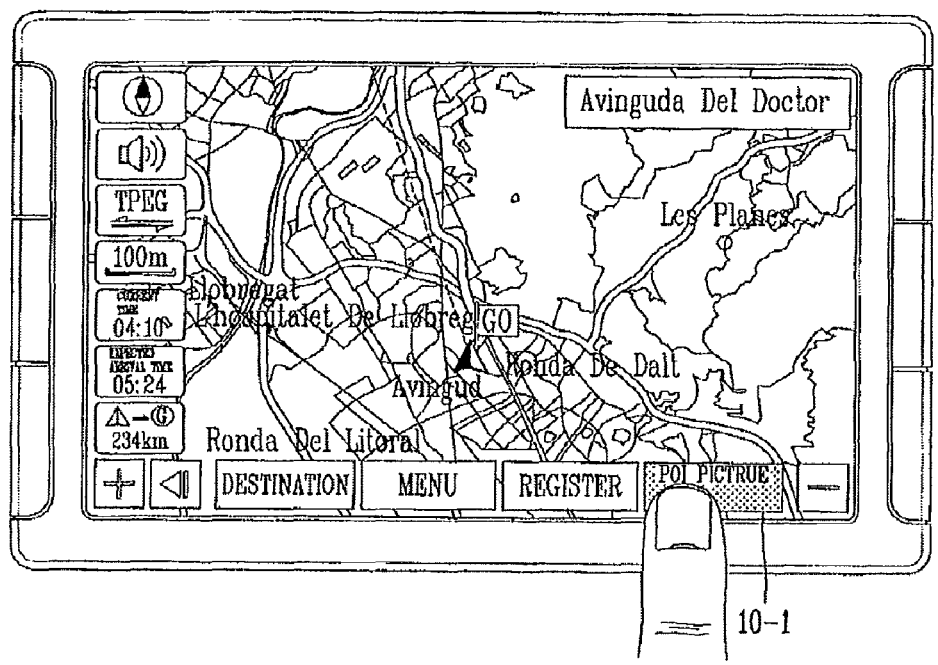
FIG. 10 illustrates a POI picture list key according to the second embodiment of the present invention.

FIG. 10 illustrates a POI photo image list key according to the second embodiment of the present invention.

As shown in FIG. 10, the controller 403 determines whether or not a POI photo image list key 10-1 displayed on the display unit 201 is selected by the user. The selection may be manual or via a voice command.

If the POI photo image list key 10-1 displayed on the display unit 201 is selected, the controller 403 displays the POI photo image list on the display unit 201.

The controller 403 determines whether or not a particular location list on the POI photo image list is selected (S21). For example, the controller 403 determines whether or not a particular photo image linked to a particular location list on the POI photo image list is selected.

Figure 11:
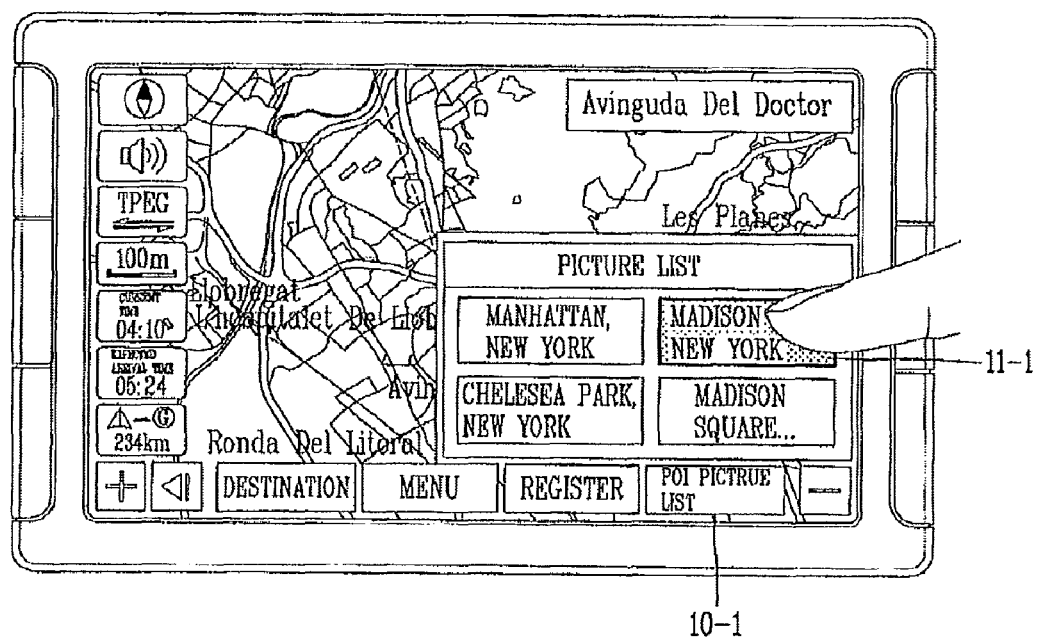
FIG. 11 illustrates a POI picture list according to the second embodiment of the present invention.

FIG. 11 illustrates a POI photo image list according to the second embodiment of the present invention.

As shown in FIG. 11, when the POI photo image list key 10-1 is selected, the controller 403 displays a POI photo image list 11-1 on the display unit 201 and determines whether or not a particular location list (e.g., Madison Ave., New York) is selected from the displayed POI photo image list 11-1. The selection may be manual or via a voice command.

When a particular location list is selected from the POI photo image list, the controller 403 displays a photo linked to the particular location list on the display unit 201.

Figure 12:
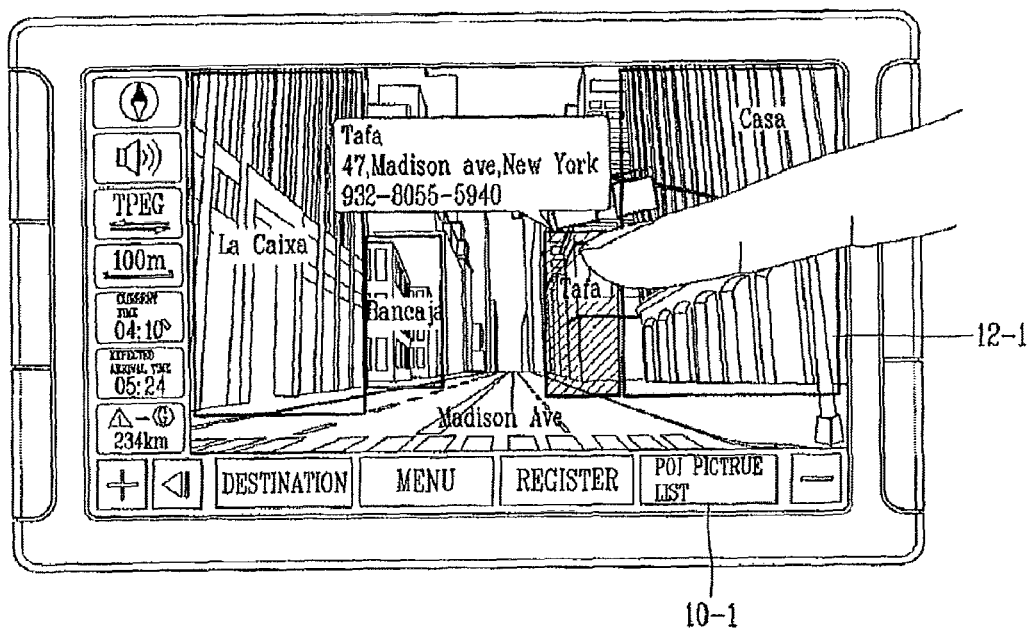
FIG. 12 illustrates a digital photo image linked to the POI picture list according to the second embodiment of the present invention.

FIG. 12 illustrates a digital photo image liked to the POI picture list according to the second embodiment of the present invention.

As shown in FIG. 12, when a particular location list is selected from the POI photo image list 11-1, the controller 403 displays a photo image 12-1 linked to the particular location list on the display unit 201 (S22 of FIG. 9).

The controller 403 determines whether or not particular POI information is selected from the plurality of pieces of POI information included in the displayed photo image (S23).

When particular POI information is selected from the plurality of pieces of POI information included in the displayed photo image, the controller 403 generates a pop-up window requesting whether to set the selected POI information as a destination and displays the generated pop-up window on the display unit 201 (S24).

Figure 13:
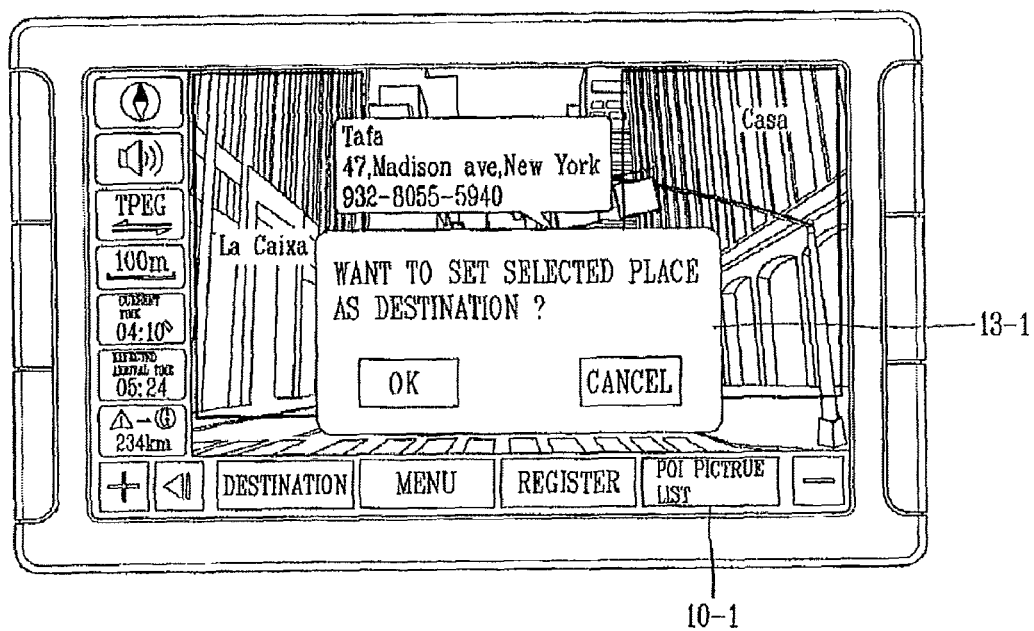
FIG. 13 illustrates a pop-up window for setting POI information as a destination according to the second embodiment of the present invention.

FIG. 13 illustrates a pop-up window for setting POI information as a destination according to the second embodiment of the present invention.

As shown in FIG. 13, when particular POI information is selected from the plurality of pieces of POI information included in the displayed photo image, the controller 403 generates a pop-up window 13-1 inquiring 'Want to set selected place (POI) as destination?' and displays the generated pop-up window 13-1 on the display unit 201. Namely, the controller 403 determines whether to set the selected POI information as a destination.

When an OK key on the displayed pop-up window 13-1 is selected, the controller 403 sets the selected POI information as a destination (S25).

The controller 403 generates a travel path from the current location of the vehicle to the destination (the place corresponding to the POI information) set by the user and provides road guidance information to the user base on the travel path (S26).

As so far described, the method and apparatus for providing POI information of the mobile terminal have the advantages in that because the POI information included -in the photo image captured by the camera can be extracted, the POI information can be displayed on the captured photo image.

In addition, road guidance information can be provided based on the POI information included in the photo image captured by the camera.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for providing Point of Interest (POI) information of a mobile terminal, the method comprising:
   reading image capture location information and image capture direction information from a digital photo image;
   extracting POI information corresponding to the image capture location information and image capture direction information from stored map data;
   displaying the extracted POI information on the digital photo image; and
   selecting, in response to user input, a location corresponding to the displayed POI information as a destination.

2. The method of claim 1, further comprising:
   reading image location altitude information and image capture angle information from the digital photo image,
   wherein the step of extracting comprises extracting the POI information based on the read image location altitude information and image capture angle information.

3. The method of claim 1, wherein the step of displaying comprises:
   matching the extracted POI information to the digital photo image.

4. The method of claim 1, further comprising:
   recording the extracted POI information on the digital photo image.

5. The method of claim 1, wherein the step of extracting of the POI information comprises:
   determining whether or not any POI information corresponding to the image capture location information and image capture direction information is included in the stored map data.

6. The method of claim 1, wherein the extracted POI information comprises road information corresponding to the image capture location information and the image capture direction information.

7. The method of claim 1, wherein the step of displaying comprises:
   displaying one or more of a name, an address, and a phone number of a building corresponding to the extracted POI information on the digital photo image.

8. The method of claim 1, further comprising:
   receiving a global positioning system (GPS) signal and generating first location data of the mobile terminal based on the received GPS signal;
   generating second location data based on a travel direction of the mobile terminal and a mobile terminal speed;
   generating an estimated mobile terminal location based on the first and second location data; and
   providing route guidance information based on a travel path from the estimated mobile terminal location to the destination.

9. An apparatus configured to provide Point of Interest (POI) information of a mobile terminal, the apparatus comprising:
   a storage unit configured to store map data; and
   a controller configured to
      read image capture location information and image capture direction information from a digital photo image;
      extract POI information corresponding to the image capture location information and image capture direction information from the stored map data;
      display the extracted POI information on the digital photo image; and
      select, in response to user input, a location corresponding to the displayed POI information as a destination.

10. The apparatus of claim 9, wherein the controller is further configured to
    read image location altitude information and image capture angle information from the digital photo image, and
    extract the POI information based on the read image location altitude information and image capture angle information.

11. The apparatus of claim 9, wherein the controller is configured to match the extracted POI information to the digital photo image.

12. The apparatus of claim 9, wherein the controller is configured to record the extracted POI information on the digital photo image.

13. The apparatus of claim 9, wherein the controller is configured to determine whether or not any POI information corresponding to the image capture location information and image capture direction information is included in the map data.

14. The apparatus of claim 9, wherein the extracted POI information includes road information corresponding to the image capture location information and image capture direction information.

15. The apparatus of claim 9, wherein the controller is configured to display one or more of a name, an address, and a phone number of a building corresponding to the extracted POI information on the digital photo image.

16. The apparatus of claim 9, further comprising:
a GPS module configured to receive a global positioning system (GPS) signal and generates first location data of the apparatus based on the received GPS signal;
a dead-reckoning sensor configured to generate second location data based on a travel direction of the apparatus and an apparatus speed;
a map matching unit configured to generate an estimated apparatus location based on the first and second location data; and
a controller configured to provide road guidance information based on a travel path from the estimated apparatus location to the destination.

17. A motor vehicle, comprising:
an apparatus configured to provide Point Of Interest (POI) information of a mobile terminal, the apparatus including:
a storage unit configured to store map data; and
a controller configured to
read image capture location information and image capture direction information from a digital photo image;
extract POI information corresponding to the image capture location information and image capture direction information from the stored map data;
display the extracted POI information on the digital photo image; and
select, in response to user input, a location corresponding to the displayed POI information as a destination.

\* \* \* \* \*